United States Patent [19]

Curatolo et al.

[11] Patent Number: 5,536,775
[45] Date of Patent: Jul. 16, 1996

[54] AMINE CURABLE COMPOSITIONS

[75] Inventors: Benedict S. Curatolo, Valley View; Frank V. Apicella, Jr., Olmsted Falls; Thomas W. Richardson, Sr., Aurora, all of Ohio

[73] Assignee: Sandoz Ltd., Basel, Switzerland

[21] Appl. No.: 334,496

[22] Filed: Nov. 4, 1994

Related U.S. Application Data

[63] Continuation-in-part of Ser. No. 203,109, Feb. 28, 1994, abandoned.

[51] Int. Cl.$^6$ .................. C08F 283/00; C08F 283/10; C08G 63/91; C08L 67/00
[52] U.S. Cl. .................. 525/530; 524/442; 525/107; 525/113; 525/523; 525/524; 525/529; 525/531; 525/540; 525/259; 525/286; 525/418; 525/451; 525/526; 528/332; 528/363; 528/366
[58] Field of Search .................. 525/107, 113, 525/523, 524, 529, 530, 531, 540, 259, 286, 418, 451, 526; 528/332, 363, 366; 524/442

[56] References Cited

U.S. PATENT DOCUMENTS

| | | | |
|---|---|---|---|
| 2,824,851 | 2/1958 | Hall | 260/45.5 |
| 2,890,202 | 6/1959 | Parker | 260/47 |
| 3,377,406 | 4/1968 | Newey et al. | 260/337 |
| 3,676,384 | 7/1972 | Rheineck et al. | 525/385 |
| 3,770,602 | 11/1973 | D'Alelio | 204/159.15 |
| 3,925,349 | 12/1975 | Gaske | 204/159.15 |
| 4,051,195 | 9/1977 | McWhorter | 260/837 |
| 4,212,776 | 7/1980 | Martinez et al. | 525/456 |
| 4,358,477 | 11/1982 | Noomen et al. | 427/54.1 |
| 4,413,105 | 11/1983 | Koenig | 525/531 |
| 4,426,243 | 1/1984 | Briggs | 156/307 |
| 4,444,806 | 4/1984 | Morgan et al. | 427/45.1 |
| 4,547,562 | 10/1985 | Nichols | 528/119 |
| 4,564,648 | 1/1986 | Huybrechts et al. | 525/404 |
| 4,581,393 | 4/1986 | Fortier et al. | 523/444 |
| 4,595,734 | 6/1986 | O'Hearn | 525/922 |
| 4,616,066 | 10/1986 | Tominaga | 525/109 |
| 4,675,374 | 1/1987 | Nichols | 528/119 |
| 4,690,988 | 9/1987 | Hoffman et al. | 525/531 |
| 4,857,599 | 8/1989 | Tomalia et al. | 525/259 |
| 4,861,832 | 8/1989 | Walsh | 525/113 |
| 5,055,378 | 10/1991 | Miyamura et al. | 430/280 |
| 5,180,792 | 1/1993 | Takada et al. | 525/423 |
| 5,198,524 | 3/1993 | Bush et al. | 528/87 |
| 5,270,368 | 12/1993 | Lent et al. | 524/236 |
| 5,373,052 | 12/1994 | Fukuda et al. | 525/54.1 |

FOREIGN PATENT DOCUMENTS

| | | |
|---|---|---|
| 0562860 | 9/1993 | European Pat. Off. . |
| 55-23143 | 2/1980 | Japan . |
| 56-38317 | 4/1981 | Japan . |
| 60-88026 | 5/1985 | Japan . |
| 62-62809 | 3/1987 | Japan . |

*Primary Examiner*—Paul R. Michl
*Assistant Examiner*—Patrick Niland
*Attorney, Agent, or Firm*—Robert S. Honor; Carl W. Battle; Carol A. Loeschorn

[57] ABSTRACT

Amine curable compositions containing a partially acrylated epoxy resin useful for forming protective and/or decorative coatings on a variety of substrates, particularly flooring substrates.

30 Claims, No Drawings

AMINE CURABLE COMPOSITIONS

This application is a continuation-in-part of Ser. No. 203,109 filed Feb. 28, 1994 now abandoned.

BACKGROUND OF THE INVENTION

1. Field of the Invention

This invention relates to amine curable compositions useful in a number of applications particularly flooring and coating applications.

2. Description of the Related Art

A common type of curable composition for use in flooring applications is a curable epoxide composition. Epoxide resins, however, have undesirable attributes such as slow cure rates and high viscosities, especially at low temperatures. Another type of curable composition for use in flooring applications is a curable acrylate composition, however, acrylate systems also demonstrate undesirable attributes, e.g. poor alkaline resistance. The method of polymerization can be a further drawback. Free radical polymerization is inhibited by oxygen and thermally activated polymerization causes problems in some areas, e.g. in flooring applications where it is difficult and problematic to uniformly heat an entire floor for even cure. Ultraviolet cure and electron beam cure are also unsatisfactory for flooring applications since generally one will only get cure on the surface with these systems and, therefore, they are not practical for bulk cure and cure of filled systems.

A combination of the properties imparted by the acrylate and epoxide functionalities is often desirable and curable compositions containing both of these functional groups are known. However, many of these have drawbacks. U.S. Pat. No. 4,051,195 describes curable compositions comprising an epoxide resin which contains more than one 1,2-epoxide group per molecule, a polyacrylate or polymethacrylate ester of a polyol wherein said ester contains more than one terminal acrylate or methacrylate group and an aliphatic amine containing at least three amine hydrogen atoms per molecule of aliphatic amine. Such compositions are described as having enhanced properties relative to an all-epoxy based composition. However, it is well known that amine curing of acrylates occurs much faster than amine curing of epoxides, so that mixtures of epoxy resins and acrylate monomers cure at different rates. This difference in cure rate results in non-homogeneous, two-phase polymers with epoxy rich regions and acrylate rich regions with correspondingly inferior properties including relatively long tack-free times for the cured material, especially at low temperatures, resulting from regions of uncured epoxy.

U.S. Pat. No. 5,198,524 discloses a storage-stable curable adhesive composition comprising a polyacrylate, a polyepoxy resin and a ketimine which undergoes a two-stage cure in which, in a first stage, the adhesive is moisture cured at ambient temperature to provide green strength. In a second stage, the adhesive is post-cured at elevated temperatures to provide a high strength bond. In a preferred embodiment, the epoxy and acrylate functionalities are on the same molecule.

U.S. Pat. No. 4,616,066 provides for a vinyl or acrylic polymer-modified epoxy resin which is the reaction product of (a) an epoxy group-containing vinyl or acrylic polymer with (B) a bisphenol compound and (C) a diglycidyl ether of a bisphenol compound. The vinyl or acrylic polymer-modified epoxy resin is described at column 5, lines 20–23, as being useful in adhesive or coating compositions in combination with known curing agents such as amines. The vinyl and acrylic polymer-modified epoxy resins have no remaining unpolymerized acrylate groups to participate in the curing reaction.

The present invention provides amine-curable compositions which contain materials having both epoxy and acrylate functionalities on the same molecule. These compositions cure rapidly and provide, after amine cure, more homogeneous polymers with correspondingly improved properties.

SUMMARY OF THE INVENTION

A "partially acrylated epoxy monomer or oligomer" is defined herein to mean a monomer or oligomer which contains at least one 1,2-epoxide group or functionality and at least one terminal acrylate group or functionality in the sable molecule, both said functionalities being capable of undergoing amine cure.

Applicants point out that in the art, the terms "epoxy acrylate" or "acrylated epoxide" generally refer to materials which contain acrylate groups but do not contain any unreacted epoxide groups on the molecule. The name refers to the fact that the materials are prepared by acrylation of an epoxide.

It has now been found that amine-curable compositions comprising a partially acrylated epoxy material and an amine curing agent cure rapidly, provide improved physical properties, particularly early-developing physical properties, and result in more homogeneous, essentially single-phase polymers having the desired properties of both the epoxide and acrylate functionalities conferred more evenly throughout the polymer. The desired properties include strength, toughness, good adhesion and good water, alkaline and heat resistance conferred by the epoxides, and fast cure and improved U.V. resistance conferred by the acrylates. The amine cure obviates the problems associated with other types of cure, e.g. ultraviolet, free radical and electron beam, when the compositions are used in flooring applications.

Specifically, the present invention provides a curable composition comprising (i) at least one partially acrylated epoxy monomer or oligomer having a molecular weight of between about 150 and 10,000, preferably 300 to 5,000 more preferably 300 to 3,000, and containing at least one 1,2-epoxide group, and at least one terminal acrylate or methacrylate group; and (ii) an active mono-, di- or polyamine curing agent in an amount at least sufficient to react with substantially all the 1,2-epoxide groups, the acrylate groups and the methacrylate groups.

Components (i), (ii) and any other components are combined just prior to use.

In another embodiment, the present invention provides for a curable composition as described above which additionally includes one or more additional monomers, oligomers or polymers which have been found particularly combinable and useful with the partially acrylated or methacrylated epoxy material to provide curable compositions with desirable overall characteristics for application, e.g. viscosity, work time and workability, and which, after cure, results in a polymeric composition possessing the desired properties for a particular application.

In a further embodiment, the curable compositions of the present invention may contain other additives, e.g. diluents; organic, inorganic or metallic aggregates; and/or fillers.

In a still further embodiment, the invention provides for a method of forming a floor on a substrate comprising the steps of a. applying a curable composition on the substrate, said curable composition comprising
   (i) at least one partially acrylated epoxy monomer or oligomer having a molecular weight of between 150 and 10,000 and containing at least one 1,2-epoxide group and at least one terminal acrylate or methacrylate group, and
   (ii) an active mono-, di- or polyamine curing agent; and
b. allowing said curable composition to harden.

The invention additionally provides for a method of forming a protective and/or decorative coating on a substrate and further provides for substrates, e.g. flooring substrates, overlaid with a coating produced by the methods.

DETAILED DESCRIPTION OF THE INVENTION

The partially acrylated or methacrylated epoxy materials useful in the present invention are monomers and oligomers having a calculated molecular weight of about 150 to about 10,000, preferably 300 to 5,000 and more preferably 300 to 3,000 and which contain at least one 1,2-epoxide group and at least one terminal acrylate group or methacrylate group per molecule. The molecular weight is either a calculated molecular weight, i.e. the sum of the atomic weights of the atoms making up the monomer or oligomer, or the molecular weight is a number average molecular weight determined based on end group analysis. If the molecular weight is less than about 150, the materials tend to be highly toxic and volatile, e.g. glycidyl acrylate and glycidyl methacrylate, and therefore are not desired from an environmental standpoint. Additionally, such low molecular weight materials tend to result in cured compounds which are more brittle than cured compounds prepared from higher molecular weight materials. As the molecular weight increases so does the viscosity and hence the materials become less workable so that the molecular weight should not exceed about 10,000 and preferably does not exceed 5,000.

The number of 1,2-epoxide groups and acrylate groups present is not particularly important provided there is at least one of each present in the material. The ratio of 1,2-epoxide groups to terminal acrylate groups is not limited, the ratio chosen will be dependent upon the characteristics desired in the cured material.

A single partially acrylated epoxy monomer or oligomer or a combination of two or more partially acrylated epoxy monomers or oligomers may be used.

Examples of suitable partially acrylated epoxy monomers and oligomers include partially acrylated bisphenol A epoxy resins; partially acrylated bisphenol F epoxy resins; partially acrylated epoxy novolac resins; partially acrylated di- or polyglycidyl ethers of various compounds, e.g. diglycidyl ether of 1,4-butanediol, diglycidyl ether of neopentyl glycol, diglycidyl ether of alkoxylated neopentyl glycols, diglycidyl ether of resorcinol, diglycidyl ether of cyclohexane dimethanol, trimethylol ethane triglycidyl ether, trimethylol propane triglycidyl ether, alkoxylated trimethylol ethane triglycidyl ether, alkoxylated trimethylol propane triglycidyl ether, diglycidyl ether of dibromoneopentyl glycol, polyglycidyl ethers of aliphatic polyols, polyglycol diepoxide, and polyglycidyl ether of castor oil; and polyurethanes, polyesters and polyethers containing at least one epoxide and at least one acrylate functionality as well as any other compound containing at least one epoxide and at least one acrylate functionality and which meets the molecular weight requirements described above. Preferably, the partially acrylated epoxy monomers and oligomers are selected from a partially acrylated bisphenol A epoxy resin, a partially acrylated bisphenol F epoxy resin, a partially acrylated epoxy novolac resin, a partially acrylated diglycidyl ether of neopentyl glycol, a partially acrylated diglycidyl ether of alkoxylated neopentyl glycol, a partially acrylated trimethylol propane triglycidyl ether, a partially acrylated alkoxylated trimethylol propane triglycidyl ether, a partially acrylated trimethylol ethane triglycidyl ether and a partially acrylated alkoxylated trimethylol ethane triglycidyl ether.

The partially acrylated epoxy materials may be commercially available, e.g. "EBECRYL 3605" sold by UCB Radcure, Inc., Smyrna, Ga. "EBECRYL 3605" is a partially acrylated bisphenol A epoxy resin containing 1 acrylate functionality and 1 epoxy functionality. To the extent not commercially available, the partially acrylated epoxy monomers and oligomers may be prepared by procedures well known in the art. One such procedure is the partial acrylation of a compound containing at least two epoxide groups. Another procedure, described in the above-mentioned U.S. Pat. No. 5,198,524 involves reacting an epoxy resin with a chain extender having an amine functionality and reacting the resulting intermediate with an acrylated isocyanate to form an oligomer having at least one epoxy and at least one acrylate functionality. A further procedure involves reacting a hydroxy glycol, e.g. glycidol, or a hydroxy acrylate, e.g. 2-hydroxyethyl acrylate, 2-hydroxyethyl methacrylate, hydroxypropyl acrylates, hydroxy propyl methacrylates, hydroxy caprolactone acrylate (TONE M-100, available from Union Carbide, Danbury, Conn.) and hydroxy caprolactone methacrylate (TONE M-200, available from Union Carbide), with a diisocyanate compound to yield a monoisocyanate acrylate or monoisocyanate epoxide and further reacting said monoisocyanate acrylate or epoxide along with the other of said monoisocyanate acrylate or epoxide with a dihydroxy or polyhydroxy compound or with any compound having two or more active hydrogens. The dihydroxy compounds may contain polyester or polyether segments or any other internal structure to confer properties appropriate to a particular application. Any polyol or polyol combination may be used. Suitable compounds having two or more active hydrogens include, amines such as the "JEFFAMINE" series of di- and triamines available from Texaco Chemical Company, Houston, Tex., and compounds having active methylene groups.

A number of variations of the above procedures, which will be obvious to one of skill in the art, will result in a variety of materials with one or more acrylate groups and one or more epoxide groups.

The curing agent is an active mono-, di- or polyamine. By "active" amine is meant a compound having a free primary or secondary amine group and which, therefore, is immediately and fully active when in contact with the partially acrylated material in contrast to other types of curing agents such as moisture actuated amine curing agents, e.g. ketimines and aldimines, which require moisture to be activated. Monoamines are compounds containing one amine group per molecule, diamines are compounds containing two amine groups per molecule and polyamines are those compounds containing three or more amine groups per molecule. Polyamines are preferred since they enhance the crosslink density in the resulting cured compounds.

A single active amine curing agent or a combination of two or more active amine curing agents may be used.

The active amines useful in the present invention may be any of those known in the art for curing epoxides and/or acrylates. Examples of suitable active amines include, but are not limited to, ethanol amine, nonyl amine, furfuryl amine, 1,3-aminopropylene nitrile, ethylene diamine, 1,4-butylene diamine, 1,6-hexamethylene diamine, m-xylylene diamine, diethylene triamine, dipropylene triamine, polyoxyalkylene monoamines, polyoxyalkylene diamines and polyoxyalkylene triamines (e.g. the "JEFFAMINE" series of di- and triamines, from Texaco Chemical Company), 1,3-bis(aminomethyl)-cyclohexane, isophorone diamine, bis(hexamethylene)triamine, bis(aminomethyl)norbornane, bis(4-aminocyclohexyl)methane, cycloaliphatic diamines and polyamines, phenalkamines, triethylenetetramine (TETA), and tetraethylene pentamine as well as any others described in U.S. Pat. No. 4,547,562, the contents of which are hereby incorporated by reference. Aminosilanes may also be used to enhance the wetting and adhesion characteristics of the composition in addition to acting as the curing agent.

Preferably amine adducts, which are well-known in the art, and particularly those prepared from a polyamine and an epoxide, acrylate, acrylonitrile or combination thereof, are used as the curing agent, since the amine adducts are generally less corrosive and easier to handle than the amines themselves. A useful amine adduct is "ANCAMINE 1769", an adduct of triethylenetetramine with propylene oxide, available from Pacific Anchor Chemical, Air Products and Chemicals, Inc., Allentown, Pa. A particularly useful amine adduct is "GASKAMINE 328", an adduct of m-xylylenediamine and epichlorohydrin, available from Mitsubishi Gas Chemical America Inc., New York, N.Y.

The reactivity of the curable compositions may optionally be controlled through the solubility/insolubility characteristics of the amine curing agent, as is known.

The phrase "an active mono-, di- or polyamine curing agent in an amount sufficient to react with substantially all the 1,2-epoxide groups, acrylate and methacrylate groups" means that there is at least a sufficient amount of an active amine curing agent present so that there will be substantially no 1,2-epoxide, acrylate or methacrylate groups available for post cure reaction.

The amine curing agent is generally used in a 1:1 ratio of active equivalents with the material to be cured, although a wide variety of ratios may be used. If an excess of amine curing agent is present, the physical properties of the cured material, e.g. tensile strength and tear resistance, tend to develop faster, however, the presence of unreacted amine can lead to decreased chemical resistance of the cured composition. If less than an equivalent of curing agent is present, a prepolymer, i.e. a polymer which is not fully cured, is obtained. The prepolymer would require post cure for full development of physical properties. In flooring applications, while the amine curing agent can be present in a wide range of equivalents, it is generally preferred that the curing agent be present in an amount at least sufficient to cure substantially all the 1,2-epoxide groups, acrylate groups and methacrylate groups.

Compounds useful as catalysts to accelerate amine cure, e.g. tertiary amines, quaternary amine salts, e.g. tetramethylammonium chloride, and hydroxy containing compounds, may be employed. Examples of suitable tertiary amines include, but are not limited to, dimethylaminomethylphenol, tris(dimethylaminomethyl)phenol and benzyldimethylamine. Suitable hydroxy containing compounds include, but are not limited to, salicylic acid and nonyl phenol.

Additionally, other materials believed to accelerate the curing of acrylates and/or epoxides, e.g. water; basic catalysts, e.g. alkali and alkaline earth metal hydroxides; acidic catalysts, e.g. hydrochloric acid; silicone compounds, e.g. tetramethoxysilane; and copper compounds, e.g. copper chloride, may be used. Combinations of two or more catalysts may also be employed to accelerate the amine cure. A particularly useful catalyst is a combination of water, hydrochloric acid and a tertiary amine, e.g. imidazole.

Depending on the particular catalyst or catalysts employed, they may be added in many different ways, but it is generally preferred that they be added to component (B) just prior to mixing components (A) and (B) together.

The partially acrylated material(s) may constitute the entire material to be cured, or the partially acrylated epoxy material(s) may be blended with other amine-curable acrylate and/or amine-curable epoxy monomers, oligomers or polymers in order to obtain the desired characteristics for particular applications of the cured composition and/or to obtain desired properties in the final cured material. One of the advantages of the present invention is that a wide variety of amounts and molecular weight ranges of the various curable components may be utilized without the common problem of phase separation. While not being bound by theory, it is believed that the partially acrylated epoxy material acts as a compatibilizer between any epoxy compounds and any acrylic compounds additionally present in the composition.

Preferably, when the curable compositions are used in flooring applications, the partially acrylated epoxy material(s) is blended with at least one mono-, di- or multifunctional acrylate, i.e. a monomer, oligomer or polymer having one, two or more terminal acrylate or methacrylate groups, in order to lower the viscosity of the curable composition. The greater the functionality, i.e. the more acrylate groups per molecule, the greater the crosslink density, the faster the cure and the earlier the tack-free time, i.e. the time it takes from initial cure to obtain a tack-free cured composition. Generally, di- or multifunctional acrylates having molecular weights of about 425 or greater are preferred due to their lower volatility and lower odor. However, as molecular weight is increased there is generally an increase in viscosity so that the upper limit of molecular weight may be determined based on viscosity considerations. Mono-functional acrylates can be used to control the rate of cure.

Examples of suitable mono-, di- or multifunctional acrylates include, but are not limited to, alkoxylated phenol monoacrylates, nonylphenol acrylate, ethylhexyl acrylate, isodecyl acrylate, cyclohexyl acrylate, cyclohexyl methacrylate, tripropylene glycol methyl ether monoacrylates, neopentylglycol propoxylate methyl ether monoacrylates, triethylene glycol dimethacrylate, ethylene glycol dimethacrylate, tetraethylene glycol dimethacrylate, polyethylene glycol dimethacrylate, 1,3-butylene glycol diacrylate, 1,4-butanediol diacrylate, 1,4-butanediol dimethacrylate, diethylene glycol diacrylate, diethylene glycol dimethacrylate, 1,6-hexanediol diacrylate, 1,6-hexanediol dimethacrylate, neopentyl glycol diacrylate, neopentyl glycol dimethacrylate, polyethylene glycol diacrylate, tetraethylene glycol diacrylate, triethylene glycol diacrylate, 1,3-butylene glycol dimethacrylate, tripropylene glycol diacrylate, polybutadiene diacrylate, ethoxylated bisphenol A dimethacrylate, ethoxylated bisphenol A diacrylate, ethoxylated neopentyl glycol diacrylate, propoxylated neopentyl glycol diacrylate, alkoxylated aliphatic diacrylate esters, tris (2-hydroxyethyl)isocyanurate trimethacrylate, trimethylolpropane trimethacrylate, trimethylolpropane triacrylate, tris(2-hydroxyethyl)isocyanurate triacrylate, pentaerythritol triacrylate, propoxylated trimethylolpropane triacrylate, ethoxylated trimethylolpropane triacrylate, propoxylated glyceryl triacrylate, pentaerythritol tetraacrylate, di-trimethylolpropane tetraacrylate, dipentaerythritol pentaacrylate and ethoxylated pentaerythritol tetraacrylate. Preferably, the di- or multifunctional acrylate is selected from ethoxylated neopentyl glycol diacrylate, propoxylated neopentyl glycol diacrylate, pentaerythritol triacrylate, propoxylated trimethylolpropane triacrylate, ethoxylated trimethylolpropane triacrylate, dipentaerythritol pentaacrylate or any combination thereof. The acrylates are generally preferred over the methacrylates due to the faster cure of the acrylates relative to the methacrylates.

The mono-, di- or multifunctional acrylate materials may contain other groups which impart certain characteristics to the final cured material. For example, acrylated silicones or acrylated urethanes may be used to obtain very flexible cured materials; fluoroacrylates, such as FX-189, 2-(N-butylperfluoro-octanesulfonamido)ethyl acrylate, available from Minnesota Manufacturing and Mining (3M), St. Paul, Minn., may be added to impart oil and water repellency, lower surface energy and enhance chemical resistance of the cured material; silane acrylates may be added to improve adhesion or surface wetting properties; and fully acrylated epoxies or fully acrylated epoxy novolacs may be used to obtain a more rigid and chemically resistant cured material. By fully acrylated epoxies or fully acrylated epoxy novolacs are meant materials which do not contain any unreacted epoxy groups.

If using a fluoroacrylate or silane acrylate, it is preferred to react the fluoroacrylate (or silane acrylate) with the amine curing agent to form an amine adduct, prior to adding either to the composition. This ensures that the fluorocarbon (or silane acrylate) will take part in the reaction before the difference in surface energy causes the fluorocarbon chains (or silane acrylate chains) to migrate to the surface of the film.

In addition to the acrylate material, the flooring compositions preferably contain at least one mono-, di- or multifunctional epoxy monomer, oligomer or polymer in order to increase solvent resistance and/or to modify viscosity, physical properties and/or chemical resistance. In general, di- and multifunctional epoxies enhance crosslink density and are therefore, preferred.

Examples of suitable epoxy compounds include, but are not limited to, alkyl glycidyl ethers, nonylphenyl glycidyl ether, cresyl glycidyl ether, phenyl glycidyl ether, epoxy compounds derived from cashew nut oil, e.g. the "CARDO-LITE" series of epoxy resins, commercially available from Cardolite Corporation, Newark, N.J., polyfunctional glycidyl ethers including those mentioned above, bisphenol A epoxy resins, bisphenol F epoxy resins, and epoxy novolac resins, e.g. the D.E.N. series of epoxy novolac resins available from the Dow Chemical Company, mono-, di- or polyglycidyl ethers of various compounds, e.g. diglycidyl ether of 1,4-butanediol, diglycidyl ether of neopentyl glycol, diglycidyl ether of alkoxylated neopentyl glycols, diglycidyl ether of resorcinol, diglycidyl ether of cyclohexane dimethanol, trimethylol ethane triglycidyl ether, trimethylol propane triglycidyl ether, alkoxylated trimethylol ethane triglycidyl ether, alkoxylated trimethylol propane triglycidyl ether, diglycidyl ether of dibromoneopentyl glycol, polyglycidyl ethers of aliphatic polyols, polyglycol diepoxide, and polyglycidyl ether of castor oil. Preferably the mono, di- or multifunctional epoxy monomer, oligomer or polymer is selected from the group consisting of bisphenol F epoxy resins, bisphenol A epoxy resins, epoxy novolac resins, diglycidyl ether of neopentyl glycol, diglycidyl ether of alkoxylated neopentyl glycol, trimethylol propane triglycidyl ether, alkoxylated trimethylol propane triglycidyl ether, trimethylol ethane triglycidyl ether and alkoxylated trimethylol ethane triglycidyl ether.

Still other specialized functionalities may be incorporated into the curable compositions of the present invention in order to obtain further improved properties. For example, epoxidized soya bean oils, acrylated epoxidized soya bean oils, tall oil acrylates and the "CARDOLITE" epoxy resins derived from cashew nut oil, all of which contain double bonds, may be added to allow for post-curing via an alternative mechanism such as oxidative free-radical polymerization.

The individual components of the curable compositions are preferably chosen so that upon mixing them together they form a liquid mixture of workable viscosity such that non-reactive diluents or solvents are unnecessary. If lower viscosities are desired, non-reactive diluents well known to one of skill in the art such as benzyl alcohol and the "NIKANOL" xylene formaldehyde resins (available from Mitsubishi Gas Chemical Company, Inc.) may be used without the problems associated with volatile organic solvents. If a solvent is necessary or desirable, suitable solvents include xylene, mineral spirits or any other solvent well known to one of skill in the art including ketones, acetates, alcohols and aromatic or aliphatic hydrocarbons.

If used in flooring applications, the partially acrylated epoxy material, the active amine curing agent and any other additional components are desirably selected so that the resulting curable composition will cure close to ambient temperature within several hours in order that the resulting floor may be placed in service within about 24 hours. Lower temperature cure down to about 0° C. can be accomplished with the aid of a catalyst. Higher temperature cures are also possible depending upon the choice of starting materials. Higher temperature cures generally result in shortened work times and faster cure rates.

In addition to the above described components, the various compositions according to the present invention may include other additives, e.g. pigments, fillers, flow and leveling additives, antimicrobial additives, antifoaming agents, ultraviolet stabilizers, fiber reinforcements, conductive fillers for conductive or antistatic coatings and aggregates including sand, gravel, stone, quartz, marble, metallic and other inorganic materials, and organic materials such as polymers. Useful polymer aggregates include elastomers, plastics and recycled plastics.

The curable compositions of the present invention are useful in a variety of applications including, but not limited to: protective and/or decorative coatings for various substrates, e.g. floors, walls, ceilings, decks (including garage decks, boat decks and wood decks), plastics, furniture; OEM coatings for flooring products, e.g. parquet (wood), vinyl sheeting, asbestos tile, masonry tile and stone surfaces; grouts; sealers; linings, e.g. linings for tanks; potting compounds; mortar repair compositions for filling cracks and fissures in various substrates; adhesives; tie coats for repair materials; and corrosion control coatings. The various substrates may be comprised of cementitious materials, stone, metal, plastic, and wood. The curable compositions may also be useful in the above described applications in emulsified form, particularly where low viscosity or the water-borne nature of the materials are an advantage. The emulsified form of the curable compositions may also be added to fresh cement mortar or concrete compositions, prior to setting, to prepare polymer-modified mortar and concrete.

As indicated above, the curable compositions are particularly useful in flooring applications. The flooring compositions according to the present invention are fast curing (the floors can generally be ready to use within 24 hours), and can be formulated, through proper choice of compounds, to be non-corrosive, substantially odor free and free from the requirement of D.O.T. hazard labels which are commonly associated with other commercially available flooring materials.

In flooring applications the curable compositions of this invention desirably additionally include at least one mono-, di- or multifunctional acrylate and at least one mono-, di- or multifunctional epoxy. Most preferably, the compositions include at least one di- or multifunctional acrylate and at least one di- or multifunctional epoxy. Generally, there is 5% to 80%, preferably 10% to 50%, by weight of the partially acrylated epoxy material, 5% to 80%, preferably 5% to 50% by weight of acrylate material and 5% to 80%, preferably 10% to 50% by weight of epoxy material present in the curable composition, the weights being based on the weight of total curable material, i.e. partially acrylated epoxy materials plus the epoxy materials and the acrylate materials present in the curable composition.

The flooring compositions may include any of the aforementioned additives or any other additives known in the art. The flooring compositions may be clear or pigmented and they may be self-leveling.

The flooring substrate may need to be prepared for application of the curable compositions and this may be accomplished by methods well known to one of skill in the art, e.g. grit blasting, metallic or shot blasting, scarifying or sanding. In addition, a primer coat may be applied to the substrate prior to application of the curable composition.

The flooring and coating compositions may be applied by any method known in the art including the trowel, squeegee, roller, spray or broadcast methods.

In a further embodiment, the present invention is directed to a method of forming a protective and/or decorative coating on a substrate comprising the steps of
a. applying a curable composition on the substrate, said curable composition comprising
  (i) at least one partially acrylated epoxy monomer or oligomer having a molecular weight of between 150 and 10,000 and containing at least one 1,2-epoxide group and at least one terminal acrylate or methacrylate group, and
  (ii) an active mono-, di- or polyamine curing agent in an amount at least sufficient to react with substantially all the 1,2-epoxide groups, acrylate groups and methacrylate groups; and
b. allowing said curable composition to harden. Desirably, said curable compositions include at least one mono-, di- or multifunctional acrylate and at least one mono-, di- or multifunctional epoxy in the amounts aforesaid.

The curable composition may additionally include aggregate which may be troweled, applied in a slurry, or in a further embodiment, aggregate may be broadcast, i.e. spread evenly over the applied curable composition by hand or by using, for example, a blower or a rotating spreader. If spread over the applied curable composition, the aggregate should be broadcast as soon as possible before the composition has a chance to substantially harden.

In another embodiment, one or more additional coatings of the curable composition may be applied on top of a first layer of curable composition. Each successive layer of curable composition should be coated after the previous coating has substantially hardened. Each layer of curable composition may be sanded after it has substantially hardened but prior to coating an additional layer of curable composition. Any number of layers of curable composition may be applied depending upon the desired smoothness of the coating.

The curable compositions of the present invention may be used to provide a wide variety of flooring surfaces, e.g. non-skid surfaces, smooth surfaces, terrazzo-type floors, conductive floors, anti-static floors and clear or pigmented floors, by utilizing floor preparation methods well-known to those skilled in the art.

The following specific examples are given to illustrate the preparation of the partially acrylated epoxy materials and curable compositions according to the present invention.

EXAMPLE 1

250 g of bisphenol F epoxy resin (D.E.R. 354, having an estimated equivalent weight of 172, commercially available from Dow Chemical Company, Midland, Mich.), 52.3 g acrylic acid, 2 g triethylamine and 0.05 g of hydroquinone monomethyl ether (MEHQ) were charged into a vessel equipped with a mechanical stirrer. The resulting mixture was stirred at 60° C. for 20 hours in a closed system. The resultant product contained a 1:1 ratio of epoxide to acrylate functional groups.

In four repetitions of the above described procedure, the ratio of starting materials was adjusted to yield products having an epoxide to acrylate ratio of 1:3, 1.3:1, 1.7:1 and 3:1, respectively. In the repeat procedures, tetramethylammonium chloride was used in place of the triethylamine. The tetramethylammonium chloride was used in an amount of 2 to 2.5 % by weight based on the weight of acrylic acid employed. The reaction temperatures ranged from 45° C. to 60° C. and the reaction times varied from 12 to 48 hours. Table 1 lists the epoxide to acrylate ratio, viscosity, estimated equivalent weight in grams/equivalent (g/eq.) and the average number of functionalities (acrylate plus epoxide) per molecule for each product obtained.

TABLE 1

| | Epoxide: Acrylate Ratio | Viscosity (cps) | Equivalent Weight (g/eq.) | Average Functionality |
|---|---|---|---|---|
| #1 | 1:1 | 20,550 @ 20.7° C. | 208 | 2 |
| #2 | 1:3 | >100,000 | 226 | 2 |
| #3 | 1.3:1 | 19,000 @ 21.9° C. | 204 | 2 |
| #4 | 1.7:1 | 14,440 @ 21.3° C. | 200 | 2 |
| #5 | 3:1 | 5,040 @ 27.8° C. | 190 | 2 |

EXAMPLE 2

The general synthetic procedure of Example 1 was repeated except that a bisphenol A epoxy resin (D.E.R. 331, equivalent weight 187 available from Dow Chemical Company) was used in place of the bisphenol F epoxy resin. The ratio of starting materials was adjusted so that the resulting products contained epoxide to acrylate ratios of 1.2:1, 1.7:1 and 3:1, respectively. Table 2 lists the product data as described for Table 1.

TABLE 2

| | Epoxide:Acrylate Ratio | Viscosity (cps) | Equivalent Weight (g/eq.) | Average Functionality |
|---|---|---|---|---|
| 1 | 1.2:1 | 128,000 @ 22.8° C. | 224 | 2 |
| 2 | 1.7:1 | 26,260 @ 21.3° C. | 217 | 2 |
| 3 | 3:1 | 67,200 @ 20.7° C. | 208 | 2 |

EXAMPLE 3

The general synthetic procedure of Example 1 was repeated six times except that the bisphenol F epoxy resin was replaced respectively with the diglycidyl ether of butanediol ("HELOXY" 67), the diglycidyl ether of neopentyl glycol ("HELOXY" 68) the diglycidyl ether of cyclohexane dimethanol ("HELOXY" 107), trimethylol ethane triglycidyl ether ("HELOXY" 5044), an epoxy novolac resin (D.E.N 431, available from Dow Chemical Co.) and trimethylol propane triglycidyl ether (TPTE) (available from CVC Specialty Chemical, Inc., Cherry Hill, N.J.). The "HELOXY" materials are all available from Shell Chemical Company, Houston, Tex. The ratio of starting materials was adjusted so that each of the resulting products contained an epoxide to acrylate ratio of substantially 1:1. Table 3 lists the product data as described for Table 1.

TABLE 3

| Starting Material | Epoxide:Acrylate Ratio | Viscosity (cps) | Equivalent Weight (g/eq.) | Average Functionality |
|---|---|---|---|---|
| "HELOXY" 67 | 1:1 | 100 @ 21.1° C. | 167 | 2 |
| "HELOXY" 68 | 1:1 | 73 @ 20.7° C. | 172 | 2 |
| "HELOXY" 107 | 0.96:1 | 757 @ 20° C. | 198 | 2 |
| "HELOXY" 5044 | 0.94:1 | 2140 @ 20.2° C. | 196 | 3 |
| D.E.N. 431 | 1:1 | 838400 @ 21.1° C. | 211.6 | 2.6–2.8 |
| TPTE | 1:1 | 1930 @ 23° C. | 179 | 3 |

EXAMPLE 4

This example illustrates the preparation of a number of acrylated epoxy polyurethanes.

(a) Preparation of a monoisocyanate epoxide. Isophorone diisocyanate (675 g, 3.04 moles) was combined with dibutyltin dilaurate (0.310 g, 4.91×10$^{-4}$ moles) in a dry nitrogen environment. The mixture was stirred and slowly heated to 45–50° C., followed by the slow addition (over 4 to 5 hours) of glycidol (225 g, 3.037 moles). The reaction was allowed to proceed until complete as evidenced by the % NCO titrated (colorimetric bromophenol blue reverse titration of excess dibutylamine with hydrochloric acid—ASTM D2572(modified)) and by FTIR.

(B) Preparation of monoisocyanate acrylate. This material was prepared in a manner analogous to (a) above except that TONE M-100 hydroxycaprolactone acrylate was used in place of the glycidol and the reaction was carried out in a dry air environment instead of a nitrogen environment.

(C) Preparation of a linear, monoepoxide, monoacrylate polyurethane.

274 g (0.551 equivalents, (eq.)) of "TERATHANE 1000" polyol (polytetramethylene ether glycol, available from DuPont Company), 80.4 g (0.275 eq.) of the glycidol isophorone monoisocyanate prepared in (a), 157.3 g (0.275) of the M100 isophorone monoisocyanate prepared in (B) and ~0.15 g of MEHQ were combined and stirred in a dry environment. The resulting mixture was slowly heated to 65°–70° C. and maintained at that temperature until the reaction was complete as evidenced by FTIR. The resultant product had an equivalent weight of 922.

(D) Preparation of a branched multifunctional (acrylate and epoxide) polyurethane.

103.0 g (0.20 eq.) of polypropyleneoxide triol, 112.6 g (0.22 eq.) polycaprolactone diol ("TONE" Polyol 0210, commercially available from Union Carbide Corporation, Danbury, Conn.), 9.1 g (0.20 eq.) of trimethylolpropane and 30.1 g (0.27 eq.) isophorone diisocyanate were combined under a nitrogen atmosphere. The resulting mixture was stirred and slowly heated to 65°–70° C. The reaction was allowed to proceed to completion, i.e. until the —NCO group was no longer detected via FTIR. The reaction was allowed to cool to room temperature and the stirring was discontinued. 39.3 g (0.13 eq.) of the glycidol isophorone monoisocyanate prepared in (a), 154.2 g (0.27 eq.) of the acrylate isophorone monoisocyanate prepared in (B) and ~0.15 g of MEHQ were introduced and stirring was continued. The resulting mixture was slowly heated to 65°–70° C., in a dry environment, and the reaction was allowed to proceed until complete as evidenced by the absence of the —NCO band as detected by FTIR. The resulting product had an average functionality of 2.6–2.7 and an equivalent weight of 1105.

Six additional linear difunctional oligomers were prepared according to procedure (C) above, except that the "TONE" polyol 0210 was replaced with "RUCOFLEX" S-1028-110, "RUCOFLEX" S-1019-120, "RUCOFLEX" S-1015-120, "RUCOFLEX" S-105-55, "ARCOL" PPG-1025 and "ARCOL" PPG-2025, respectively. The "RUCOFLEX" materials are all saturated polyester diols available from Ruco Polymer Corporation, Hicksville, N.Y. and the "ARCOL" materials are polyethers available from Arco Chemical Company, South Charleston, W. Va.

EXAMPLE 5

A curable composition was prepared as follows:

| | Amount (g) |
|---|---|
| Component (A) | |
| "EBECRYL 3605" (partially acrylated bisphenol A epoxy resin) | 31.5 |
| D.E.N. 431 (an epoxy novolac resin, available from the Dow Chemical Company) | 11.0 |
| D.E.R. 354 (bisphenol F epoxy resin, available from the Dow Chemical Company) | 11.0 |

13
-continued

| | Amount (g) |
|---|---|
| PHOTOMER 4149 (aliphatic trifunctional acrylate, available from Henkel Corporation) Component (B) | 43.5 |
| DEHYDRAN 1208 (Defoamer, available from Henkel Corporation, Ambler, PA) | 0.64 |
| GASKAMINE 328 | 29.60 |

The composition was prepared by combining components (A) and (B) at 21° C. and blending for 1 minute. The mixture was drawn down to form a 20 mil film at 21° C. A second composition and film were prepared in the same manner except at a temperature of 10° C. instead of 21° C. Two comparative curable compositions, each at a temperature of 10° C. and 21° C., were prepared as above except that in comparative example 1, the partially acrylated bisphenol A epoxy resin, "EBECRYL 3605", was replaced with 26.42 g (0.1398 eq.) of bisphenol A epoxy resin, D.E.R. 331, available from Dow Chemical Company. In comparative example 2, the "EBECRYL 3605" was left out, the amount of GASKAMINE-328 was reduced to 21.93 g and the amount of DEHYDRAN was reduced to 0.46 g.

At 21° C., the film containing the partially acrylated bisphenol A epoxy resin had cured, was tack-free to mylar and exhibited good clarity within 24 hours. In contrast, the film containing the bisphenol A epoxy resin, although cured and tack-free to mylar, was very cloudy at the end of 24 hours. The cloudiness is believed to be attributed to phase separation of the epoxy and acrylate materials. After 24 hours, comparative example 2, without either partially acrylated bisphenol A epoxy resin or bisphenol A epoxy resin, had a marbled or rippled appearance, felt sticky to the touch and failed the mylar test.

At 10° C., the film containing the partially acrylated material was cured, tack-free to mylar and exhibited good clarity within 24 hours. On the other hand, the film containing the bisphenol A epoxy resin took at least 4 hours longer to cure and be tack-free to mylar and the cured film was very cloudy. The film without either the partially acrylated bisphenol A epoxy resin or the bisphenol A epoxy resin had not cured sufficiently after 7 days to measure the physical properties.

The physical properties, i.e. the tensile strength (psi), modulus of elasticity (psi), hardness (Shore D) and tear resistance (lbs/in) of the resulting films at both 21° C. and 10° C. were measured at 1 and 7 day periods. The tensile testing and modulus of elasticity were performed according to ASTM D 412 (crosshead speed of 20 in./min.) with Die C, the hardness testing was performed according to ASTM D 2240 and the tear testing was performed according to ASTM D 1004 (crosshead speed of 20 in./min.)with Die C. The measurements are reported in Table 4.

TABLE 4

| | Tensile Strength (psi) | | Modulus of Elasticity (psi) | | Hardness (Shore D) | | Tear Resistance (lbs/in) | |
|---|---|---|---|---|---|---|---|---|
| | 21° C. | 10° C. | 21° C. | 10° C. | 21° C. | 10° C. | 21° C. | 10° C. |
| (1 DAY MEASUREMENTS) | | | | | | | | |
| EBECRYL 3605 | | | | | | | | |
| Example | 2247 | 876 | 41060 | 5903 | 45 | 30 | 309 | 78 |
| Comparative Example 1 | 1729 | 190 | 9912 | 15 | 37 | 7 | 150 | 9 |
| Comparative Example 2 | Film too tacky to measure physical properties | | | | | | | |
| (7 DAY MEASUREMENTS) | | | | | | | | |
| EBECRYL 3605 | | | | | | | | |
| Example | 9121 | 6945 | 284800 | 174700 | 69 | 65 | 467 | 505 |
| Comparative Example 1 | 9485 | 847 | 322200 | 4991 | 74 | 22 | 535 | 94 |
| Comparative Example 2 | 338 | ** | 2695 | ** | 15 | ** | 36 | ** |

**The film had not cured sufficiently to measure the physical properties.

The above data demonstrate that the partially acrylated epoxy material imparts shorter cure times and better one day physical properties at both 21° C. and 10° C., as well as enhanced seven day physical properties at 10° C.

EXAMPLE 6

Six curable compositions according to the present invention were prepared as follows:

| Component (A) | Amount (g) |
|---|---|
| Partially acrylated epoxy material | 31.5 |
| D.E.N 431 | 11.0 |
| D.E.R. 354 | 11.0 |
| PHOTOMER 4149 | 43.5 |
| Component (B) | Amount |
| GASKAMINE-328 | approximately 30 g* |

*The amount of GASKAMINE-328 used in each example varied slightly, but was calculated so that there was a 1:1 ratio of active equivalents between components (a) and (B).

The partially acrylated epoxy materials used were different for each of the compositions. Except for EBECRYL 3605, the acrylated epoxy materials were those prepared in Examples 1 and 2 above, as indicated in Table 5.

Components (A) and (B) were combined, blended for 1 minute and cast into 20 mil thick films. The physical properties of the films (measured as described in example 5) at 1 and 7 days are reported in Table 5.

TABLE 5

| Partially Acrylated Epoxy | Tensile Strength (psi) | Modulus of Elasticity (psi) | Hardness (Shore D) | Tear Resistance (lbs/in) |
|---|---|---|---|---|
| (1 DAY MEASUREMENTS) | | | | |
| EBECRYL 3605 | 3788 | 107500 | 53 | 537 |
| Example 1, #2 (see Table 1) | 2981 | 81340 | 50 | 486 |
| Example 1, #1 (see Table 1) | 5524 | 163100 | 61 | 690 |
| Example 1, #3 (see Table 1) | 4826 | 160300 | 57 | 675 |
| Example 1, #4 (see Table 1) | 4663 | 148500 | 60 | 653 |
| Example 1, #5 (see Table 1) | 4934 | 176800 | 60 | 677 |
| Example 2, #1 (see Table 2) | 2582 | 60440 | 52 | 401 |
| Example 2, #2 (see Table 2) | 4004 | 91370 | 61 | 513 |
| Example 2, #3 (see Table 2) | 3283 | 120300 | 56 | 499 |
| Example 3, ("HELOXY" 68) | 1216 | 6691 | 30 | 86 |
| Example 3, ("HELOXY" 107) | 2804 | 2804 | 32 | 70 |
| Example 3 ("HELOXY" 5044) | 1027 | 5263 | 30 | 90 |
| EBECRYL 3605 plus "HELOXY" 5044, 15.75 g each | 1804 | 12780 | 45 | 193 |
| (7 DAY MEASUREMENTS) | | | | |
| EBECRYL 3605 | 10170 | 599900 | 70 | 642 |
| Example 1, #2 (see Table 1) | 9972 | 533500 | 75 | 632 |
| Example 1, #1 (see Table 1) | 9600 | 350000 | 70 | 380 |
| Example 1, #3 (see Table 1) | 11190 | 664400 | 70 | 512 |
| Example 1, #4 (see Table 1) | 11380 | 530300 | 75 | 484 |
| Example 1, #5 (see Table 1) | 10630 | 525400 | 75 | 434 |
| Example 2, #1 (see Table 2) | 10400 | 345300 | 74 | 395 |
| Example 2, #2 (see Table 2) | 10610 | 358200 | 73 | 361 |
| Example 2, #3 (see Table 2) | 10150 | 437000 | 69 | 541 |
| Example 3, ("HELOXY" 68) | 5962 | 244000 | 64 | 545 |
| Example 3, ("HELOXY" 107) | 4509 | 174100 | 61 | 587 |
| Example 3, ("HELOXY"5044) | 5707 | 208200 | 66 | 590 |
| EBECRYL 3605 plus "HELOXY" 5044 (15.75 g each) | 8068 | 270400 | 73 | 445 |

EXAMPLE 7

Five curable compositions according to the present invention were prepared as follows:

| Component (A) | Amount (g) |
| --- | --- |
| Partially acrylated epoxy oligomer | 10.0 |
| D.E.R. 354 | 17.0 |
| PHOTOMER 4149 | 38.5 |
| EBECRYL 3605 | 34.5 |

| Component (B) | Amount |
| --- | --- |
| GASKAMINE-328 | ** |
| ANCAMINE 1769 | ** |

**The GASKAMINE and ANCAMINE cure agents were used in 50/50 (w/w) blend (the blend having an equivalent weight of 51.26) in an amount calculated so that there was a 1:1 ratio of active equivalents between components (A) and (B).

The partially acrylated epoxy oligomers used were different for each of the compositions and were those prepared in Example 4 above, as indicated in Table 6 by reference to the variable component used to make the oligomers.

Components (A) and (B) were combined, blended for 1 minute and cast into 20 mil thick films. The physical properties, i.e. tensile strength and elongation (measured as in example 5), of the films at 1 and 7 days are reported in Table 6.

TABLE 6

| Partially Acrylated | Tensile Strength (psi) | |
| --- | --- | --- |
| Material | 1 Day | 7 Day |
| "TONE" Polyol 0210 | 1700 | 7867 |
| "RUCOFLEX" S-1028-110 | 1890 | 8603 |
| "RUCOFLEX" S-1019-120 | 2291 | 6858 |
| "RUCOFLEX" S-105-55 | 2191 | 7018 |
| "TERATHANE" 1000 | 2352 | 7483 |

EXAMPLE 8

Two additional curable compositions were prepared in analogous manner to those in example 7 except that the composition of component (A) was as follows:

| Component (A) | Amount (g) |
| --- | --- |
| Partially acrylated epoxy oligomer | 20.0 |
| D.E.R. 354 | 13.0 |
| PHOTOMER 4149 | 40.0 |
| EBECRYL 3605 | 27.0 |

The measured physical properties of the films at 1 and 7 days are reported in Table 7.

TABLE 7

| Partially Acrylated | Tensile Strength (psi) | |
| --- | --- | --- |
| Oligomer | 1 Day | 7 Day |
| "RUCOFLEX" S-1028-110 | 8970 | 10200 |
| "RUCOFLEX" S-1015-120 | 6340 | 10120 |

EXAMPLE 9

Four curable compositions according to the present invention were prepared and cast into films in a manner analogous to example 6 except component (A) was as follows:

| Curable Composition | "EBECRYL 3605" (g) | Partially Acrylated HELOXY 67 (g) (Prepared in Example 3) | HELOXY 67 (g) | Partially Acrylated D.E.N. 431 (g) (Prepared in Example 3) |
| --- | --- | --- | --- | --- |
| #1 | 35 | 35 | — | — |
| #2 | 35 | — | 35 | — |
| #3 | — | 35 | — | 35 |
| #4 | — | — | 35 | 35 |

The physical properties of the films at 1 and 7 days were measured (as described in example 5) and are reported in Table 8.

TABLE 8

| Composition | Tensile Strength (psi) | Modulus of Elasticity (psi) | Hardness (Shore D) | Tear Resistance (lbs/in) |
| --- | --- | --- | --- | --- |
| (1 DAY MEASUREMENTS) | | | | |
| 1 | 8617 | 304700 | 65 | * |
| 2 | 3442 | 83400 | 60 | 545 |
| 3 | 9290 | 310500 | 72 | 857 |
| 4 | 11980 | 299700 | 73 | 677 |
| (7 DAY MEASUREMENTS) | | | | |
| 1 | 7976 | 274900 | 69 | * |
| 2 | 11360 | 353600 | 60 | 651 |
| 3 | 10130 | 467300 | 74 | * |
| 4 | 11670 | 563800 | 73 | * |

*The tear resistance for these compositions was not measured.

EXAMPLE 10

A curable composition according to the present invention was prepared and cast into a film in a manner analogous to example 6, with components (A) and (B) as follows:

|  | Amount (g) |
|---|---|
| Component (A) | |
| "EBECRYL 3605" | 15.0 |
| D.E.N. 431 | 16.9 |
| D.E.R. 354 | 16.9 |
| HELOXY 5048 (trimethylol propane triglycidyl ether, available from Shell Chemical Company) | 41.2 |
| PHOTOMER 4127 (aliphatic difunctional acrylate, available from Henkel Corporation) | 2.0 |
| PHOTOMER 4149 | 8.0 |
| Component B | |
| GASKAMINE 328 | 31.9 |
| Benzyl alcohol | 8.0 |

The physical properties of the resulting film (measured as described in example 5) at 1 and 7 days are reported in Table 9.

TABLE 9

| Composition | Tensile Strength (psi) | Modulus of Elasticity (psi) | Hardness (Shore D) | Tear Resistance (lbs/in) |
|---|---|---|---|---|
| (1 DAY MEASUREMENTS) | | | | |
| Example 10 | 8601 | 267000 | 69 | 834 |
| (7 DAY MEASUREMENTS) | | | | |
| Example 10 | 12460 | 369000 | 74 | 445 |

EXAMPLE 11

Curable compositions according to the present invention were prepared as follows:

|  | Amount (g) |
|---|---|
| Component (A) | |
| "EBECRYL 3605" | 16.1 |
| D.E.N. 431 | 18.1 |
| D.E.R. 354 | 18.1 |
| HELOXY 5048 | 44.1 |
| PHOTOMER 4127 | 2.1 |
| PHOTOMER 4149 | 8.6 |
| Component B | |
| GASKAMINE 328 | 34.3 |
| Benzyl alcohol | 8.6 |
| Accelerator+ | |

+See Table 10 below for the specific accelerator used in each composition.
*The amount of accelerator added in each composition varied depending on the particular accelerator employed with the amounts used indicated in Table 10.

The accelerator was added into component (B) just prior to mixing components (A) and (B) together. The effect of the accelerators on bulk cure were evaluated by 150 gram mass gel times, as measured using a Standard Wire Stirrer Model Gel Timer from the Paul N. Gardner Co., Inc., Pompano Beach, Fla.

TABLE 10

| Accelerator | Temperature (°F.) | Gel Time (minutes) | % Increase In Speed of Bulk Cure |
|---|---|---|---|
| none | 60 | 29.8 | (control) |
| 1.5 g $CuCl_2 \cdot 2H_2O$ + 3 g $H_2O$ | 60 | 11.2 | 62.4% |
| 3 g Imidazole.HCl + 3 g $H_2O$ | 60 | 8.2 | 72.5% |
| 3 g Imidazole + 3 g $H_2O$ | 60 | 13.3 | 55.4% |
| 3 g 2,4,6-Tri(dimethyl-aminomethyl)phenol | 60 | 26.5 | 11.1% |
| 3 g Salicylic Acid | 60 | 27.0 | 9.4% |
| 3 g Tetramethoxy-silane | 60 | 27.7 | 7.0% |
| none | 70 | 21.7 | (control) |
| 3 g 10% HCl | 70 | 9.3 | 57.1% |
| 3 g $H_2O$ | 70 | 12.4 | 42.9% |
| 3 g 10% NaOH | 70 | 12.5 | 42.4% |
| 3 g Nonylphenol | 70 | 19.4 | 10.6% |

EXAMPLE 12

A curable composition according to the present invention was prepared as follows:

|  | Amount (g) |
|---|---|
| Component (A) | |
| EBECRYL 3605 | 273.6 |
| Epalloy 8250 (Epoxy Novolac Resin available from CVC Specialty Chemicals, Inc., Cherry Hill, NJ) | 440.1 |
| D.E.R. 354 | 596.7 |
| HELOXY 5048 | 1073.4 |
| PHOTOMER 4127 | 44.2 |
| PHOTOMER 4149 | 177.1 |
| Component (B) | |
| GASKAMINE 328 | 876.4 |
| Benzyl Alcohol | 584.2 |
| Component (C) | |
| Graded Silica Sand Flintshot (available from U.S. Silica Co., Berkeley Springs, WV) | 33,290 9,120 |
| ZEEOSPHERES ® (available from Zeelan Industries, Inc., St. Paul, MN) | 2,950 |

The composition was prepared by first combining components (A) and (B), then mixing in component (C). The mixture was then troweled onto a concrete substrate. Cube samples were also prepared for compressive strength measurements, which were performed according to ASTM C 109 and are reported below.

| Time | Compressive Strength (psi) |
|---|---|
| 4 hours | 460 |
| 8 hours | 1920 |
| 12 hours | 2920 |
| 16 hours | 4130 |
| 24 hours | 4420 |
| 7 days | 8050 |

The compositions of the foregoing examples when used, for example, as floor coating compositions, may be additionally mixed, as conventional, with minor total amounts, generally up to about 3% by weight, of an additive composition containing one or more defoaming agents, surface leveling agents, U.V. stabilizers, antioxidants, and inhibitors (to prevent free radical polymerization of the acrylates), which additives do not affect the physical properties of the coatings.

We claim:

1. A curable composition comprising
   (i) at least one partially acrylated epoxy monomer or oligomer having a number average molecular weight of between 300 and 10,000 and containing at least one 1,2-epoxide group and at least one terminal acrylate or methacrylate group; and
   (ii) an active mono-, di- or polyamine curing agent in an amount at least sufficient to react with substantially all the 1,2-epoxide groups, the acrylate groups and methacrylate groups.

2. A curable composition comprising
   (i) at least one partially acrylated epoxy monomer or oligomer having a number average molecular weight of between 150 and 10,000 and containing at least one 1,2-epoxide group and at least one terminal acrylate or methacrylate group wherein the partially acrylated epoxy monomer or oligomer is selected from the group consisting of a partially acrylated bisphenol A epoxy resin, a partially acrylated bisphenol F epoxy resin, a partially acrylated epoxy novolac resin, a partially acrylated diglycidyl ether of neopentyl glycol, a partially acrylated diglycidyl ether of alkoxylated neopentyl glycol, a partially acrylated trimethylol propane triglycidyl ether, a partially acrylated alkoxylated trimethylol propane triglycidyl ether, a partially acrylated trimethylol ethane triglycidyl ether and a partially acrylated alkoxylated trimethylol ethane triglycidyl ether; and
   (ii) an active mono-, di- or polyamine curing agent in an amount at least sufficient to react with substantially all the 1,2-epoxide groups, the acrylate groups and methacrylate groups.

3. A curable composition according to claim 1 which additionally includes at least one mono-, di- or multifunctional acrylate monomer, oligomer or polymer.

4. A curable composition according to claim 1 which additionally includes at least one mono-, di- or multifunctional epoxy monomer, oligomer or polymer.

5. A curable composition according to claim 3 which further includes at least one mono-, di- or multifunctional epoxy monomer, oligomer or polymer wherein there is 10 to 50% of the partially acrylated epoxy monomer or oligomer, 5 to 50% of the mono-, di- or multifunctional acrylate monomer, oligomer or polymer and 10 to 50% of the mono-, di- or multifunctional epoxy monomer, oligomer or polymer present in said curable composition, all % being by weight based on the combined weight of the partially acrylated epoxy monomer or oligomer, the mono-, di- or multifunctional acrylate monomer, oligomer or polymer and the mono-, di- or multifunctional epoxy monomer, oligomer or polymer.

6. A curable composition according to claim 1 wherein the curing agent is an active polyamine.

7. A curable composition according to claim 6 wherein the active polyamine is a polyamine adduct prepared from a polyamine and an epoxide, acrylate, acrylonitrile or combination thereof.

8. A curable composition according to claim 1 wherein the partially acrylated epoxy monomer or oligomer has a number average molecular weight of between 300 and 5,000.

9. A curable composition according to claim 3 wherein the mono-, di- or multifunctional acrylate monomer, oligomer or polymer is selected from the group consisting of ethoxylated neopentyl glycol diacrylate, propoxylated neopentyl glycol diacrylate, pentaerythritol triacrylate, propoxylated trimethylolpropane triacrylate, ethoxylated trimethylolpropane triacrylate, dipentaerythritol pentaacrylate or any combination thereof.

10. A curable composition according to claim 4 wherein the mono-, di- or multifunctional epoxy monomer, oligomer or polymer is selected from the group consisting of bisphenol F epoxy resins, bisphenol A epoxy resins, epoxy novolac resins, diglycidyl ether of neopentyl glycol, diglycidyl ether of alkoxylated neopentyl glycol, trimethylol propane triglycidyl ether, alkoxylated trimethylol propane triglycidyl ether, trimethylol ethane triglycidyl ether and alkoxylated trimethylol ethane triglycidyl ether.

11. A curable composition according to claim 5 wherein the mono-, di- or multifunctional epoxy monomer, oligomer or polymer is selected from the group consisting of bisphenol F epoxy resins, bisphenol A epoxy resins, epoxy novolac resins, diglycidyl ether of neopentyl glycol, diglycidyl ether of alkoxylated neopentyl glycol, trimethylol propane triglycidyl ether, alkoxylated trimethylol propane triglycidyl ether, trimethylol ethane triglycidyl ether and alkoxylated trimethylol ethane triglycidyl ether.

12. A curable composition according to claim 1 which additionally includes a non-reactive diluent.

13. A curable composition according to claim 1 which additionally includes aggregate.

14. A curable composition according to claim 13 wherein the aggregate is selected from the group consisting of sand, gravel, stone, quartz, marble, metallic materials and polymeric aggregate.

15. A curable composition according to claim 1 which additionally includes an accelerator for accelerating amine cure.

16. A curable composition according to claim 15 wherein the accelerator is selected from the group consisting of tertiary amines, quaternary amine salts, hydroxy containing compounds, water, basic catalysts, acidic catalysts, silicone compounds and copper compounds.

17. A curable composition according to claim 2 which additionally includes at least one mono-, di- or multifunctional acrylate monomer, oligomer or polymer.

18. A curable composition according to claim 2 which additionally includes at least one mono-, di- or multifunctional epoxy monomer, oligomer or polymer.

19. A curable composition according to claim 17 which further includes at least one mono-, di- or multifunctional epoxy monomer, oligomer or polymer wherein there is 10 to 50% of the partially acrylated epoxy monomer or oligomer, 5 to 50% of the mono-, di- or multifunctional acrylate monomer, oligomer or polymer and 10 to 50% of the mono-, di- or multifunctional epoxy monomer, oligomer or polymer present in said curable composition, all % being by weight based on the combined weight of the partially acrylated epoxy monomer or oligomer, the mono-, di- or multifunctional acrylate monomer, oligomer or polymer and the mono-, di- or multifunctional epoxy monomer, oligomer or polymer.

20. A curable composition according to claim 2 wherein the curing agent is an active polyamine.

21. A curable composition according to claim 20 wherein the active polyamine is a polyamine adduct prepared from a polyamine and an epoxide, acrylate, acrylonitrile or combination thereof.

22. A curable composition according to claim 2 wherein the partially acrylated epoxy monomer or oligomer has a number average molecular weight of between 300 and 5,000.

23. A curable composition according to claim 17 wherein the mono-, di- or multifunctional acrylate monomer, oligomer or polymer is selected from the group consisting of ethoxylated neopentyl glycol diacrylate, propoxylated neopentyl glycol diacrylate, pentaerythritol triacrylate, propoxylated trimethylolpropane triacrylate, ethoxylated trimethylolpropane triacrylate, dipentaerythritol pentaacrylate or any combination thereof.

24. A curable composition according to claim 18 wherein the mono-, di- or multifunctional epoxy monomer, oligomer or polymer is selected from the group consisting of bisphenol F epoxy resins, bisphenol A epoxy resins, epoxy novolac resins, diglycidyl ether of neopentyl glycol, diglycidyl ether of alkoxylated neopentyl glycol, trimethylol propane triglycidyl ether, alkoxylated trimethylol propane triglycidyl ether, trimethylol ethane triglycidyl ether and alkoxylated trimethylol ethane triglycidyl ether.

25. A curable composition according to claim 19 wherein the mono-, di- or multifunctional epoxy monomer, oligomer or polymer is selected from the group consisting of bisphenol F epoxy resins, bisphenol A epoxy resins, epoxy novolac resins, diglycidyl ether of neopentyl glycol, diglycidyl ether of alkoxylated neopentyl glycol, trimethylol propane triglycidyl ether, alkoxylated trimethylol propane triglycidyl ether, trimethylol ethane triglycidyl ether and alkoxylated trimethylol ethane triglycidyl ether.

26. A curable composition according to claim 2 which additionally includes a non-reactive diluent.

27. A curable composition according to claim 2 which additionally includes aggregate.

28. A curable composition according to claim 27 wherein the aggregate is selected from the group consisting of sand, gravel, stone, quartz, marble, metallic materials and polymeric aggregate.

29. A curable composition according to claim 1 which additionally includes an accelerator for accelerating amine cure.

30. A curable composition according to claim 29 wherein the accelerator is selected from the group consisting of tertiary amines, quaternary amine salts, hydroxy containing compounds, water, basic catalysts, acidic catalysts, silicone compounds and copper compounds.

* * * * *